May 5, 1942. H. MAGNUS 2,281,588
END DAM FOR A MILK DESICCATOR
Filed Feb. 16, 1939 2 Sheets-Sheet 1
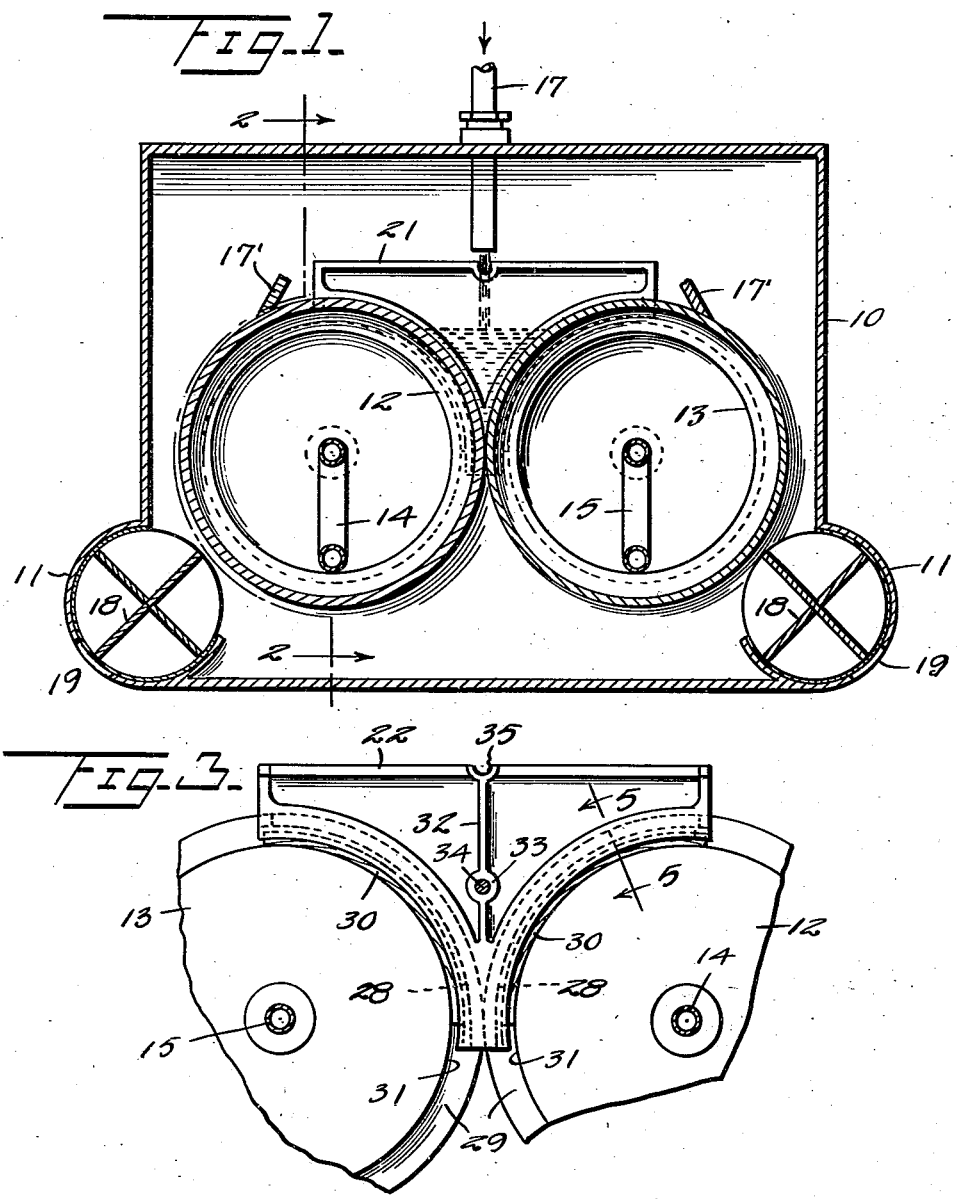
Henry Magnus
INVENTOR
BY Victor J. Evans & Co.
ATTORNEYS May 5, 1942.     H. MAGNUS     2,281,588
END DAM FOR A MILK DESICCATOR
Filed Feb. 16, 1939     2 Sheets-Sheet 2
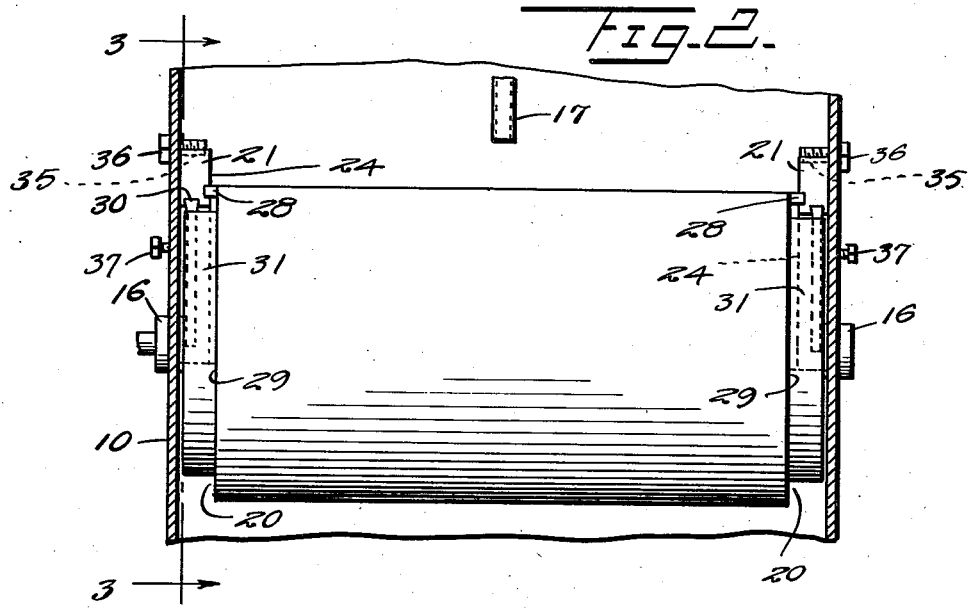
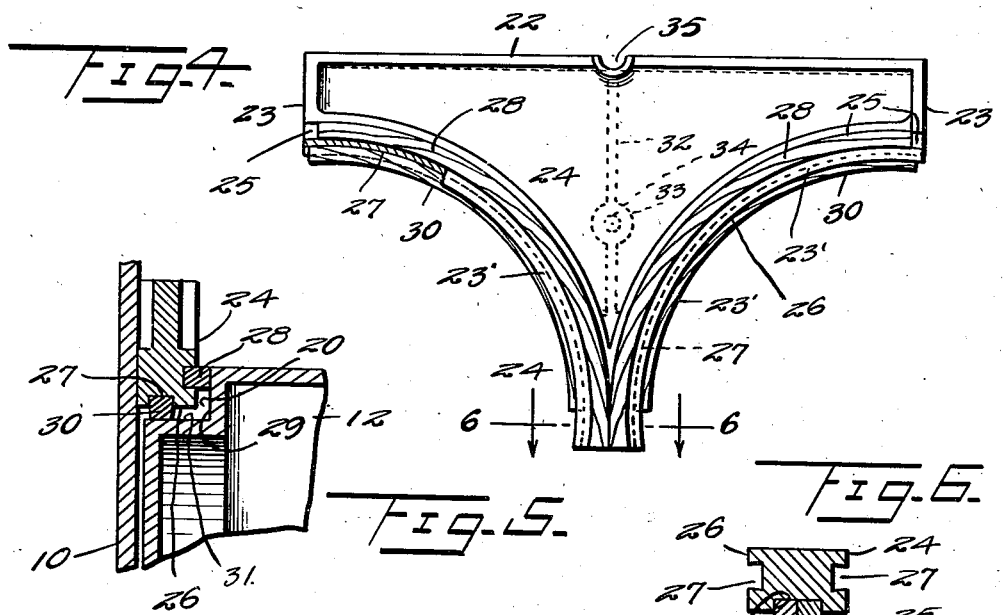
Henry Magnus
INVENTOR
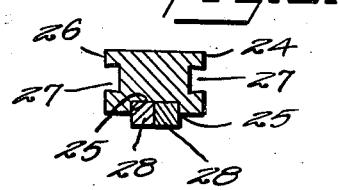
ATTORNEYS Patented May 5, 1942

2,281,588

UNITED STATES PATENT OFFICE 2,281,588

END DAM FOR MILK DESICCATORS

Henry Magnus, Nichols, Wis.

Application February 16, 1939, Serial No. 256,792

2 Claims. (Cl. 159—11)

My invention relates broadly to milk desiccators, and more particularly to an article of manufacture adapted to coact with the ends of a pair of contiguous rollers to hold a liquid therebetween.

An important object of my invention is the provision of end dams adapted to be positioned at the ends of contiguous rollers to hold a liquid in the chamber formed by the dams and rollers.

Another object of my invention is the provision of end dams that are adjustable to allow for the abrasive wearing away of the parts of the dams contacting the said rollers.

Yet another object of my invention is the provision of end dams wherein the wearing parts may be easily and expeditiously replaced.

Still another object of my invention is the provision of end dams that are simple in construction, efficient in operation, and inexpensive to manufacture.

Other objects and advantages of my invention will be apparent during the course of the following description.

In the drawings, forming a part of this specification, and in which like numerals are employed to designate like parts throughout the same, Fig. 1 is a transverse vertical sectional view of my device, Fig. 2 is a fragmentary vertical sectional view taken on the line 2—2 of Fig. 1, Fig. 3 is a fragmentary sectional view taken on the line 3—3 of Fig. 2, and illustrating one of the end dams in its association with the rollers, Fig. 4 is a plan view of the end dam, Fig. 5 is a fragmentary sectional view taken on the line 5—5 of Fig. 3, and Fig. 6 is a transverse sectional view taken on the line 6—6 of Fig. 4.

In the accompanying drawings, wherein for the purpose of illustration, is shown a preferred embodiment of my invention, the numeral 10 designates a box-like housing formed at its lower longitudinal edges with arcuated protuberances 11. Rollers 12 and 13 are rotatably journaled in the housing 10 and have pipe fittings 14 and 15 projecting therein. At one end, the pipe fittings 14 and 15 extend exteriorly of the housing, through the trunnions 16, where they are connected to any suitable steam generating unit, and convey superheated steam into the rollers to discharge the same against the peripheries of the rollers to effectively heat the same. A pipe 17 projects into the top of the housing above the rollers 12 and 13 to discharge a predetermined quantity of liquid milk into the space between the rollers. The milk is discharged from the pipe 17 in a thin film onto the heated surfaces of the rollers where all volatile substances contained in the milk are quickly vaporized so that only the solid particles of the milk will remain. A suitable mechanism (not shown) is provided to rotate the rollers and the solid particles of the milk which adhere to the outer surface of the cylinders, are carried to the scrapers 17' which bear against the entire length of the rollers and remove the solid particles therefrom so that they will fall into the rotary fans 18 positioned in the protuberances 11. The fans 18 may be rotated by any suitable means, and transport the particles falling therein exteriorly of the receptacle through discharge ports 19. The rollers 12 and 13 are formed with outer annular recesses 20 at both ends, said recesses being adapted to receive the transverse end dams 21.

The dams 21 are formed of cast aluminum, or the like, and have a horizontal top portion 22 and vertical upper side walls 23. The lower portions 23' of the side walls are inwardly convergent and arcuated in their formation, as illustrated in Fig. 4. The lower ends of the inwardly convergent walls 23' do not meet, but are separated by a substantial distance, commensurate with the distance between the recessed ends of the rollers. The inner face 24 of each dam is provided with a pair of arcuated recesses 25 which are concentric to the arcuated lower portions 23' of the side walls 23, and the bottom surface 26 of the lower portion 23' is provided with a dove-tailed groove 27. Packing strips 28, of wood or the like, are pressed in the grooves 25 and have a portion thereof projecting a substantial distance beyond the inner face of the end dam to contact the vertical wall 29 of the recess 20. The dove-tailed groove 27 is similarly provided with a packing strip 30, of wood or the like. The strip 30 is trapezoidal in cross section so that the same may be received and maintained within the dove-tailed groove 27, and has a portion thereof projecting a substantial distance beyond the periphery of the arcuated portions 23' to contact the horizontal wall 31 of the annular recess 20. The outer face of the dam is formed with a vertical rib 32, and integral therewith, at substantially the center of the dam, is a boss 33 in which is drilled a cul-de-sac 34. The top 22 of the dam is recessed centrally thereof, as at 35, and receives the bolt 36 therein. The bolt 36 prevents a vertical displacement of the dam.

An adjusting screw 37 is threadedly received in the end wall of the housing with its inner end received in the cul-de-sac 34. The operation of the device is as follows:

As herebefore described, the rollers 12 and 13 are adapted to rotate, and the end dams are positioned with the packing strips 28 and 30 bearing against the vertical and horizontal walls of the annular recesses 20. In order that union may be water-tight at all times, adjusting screws 36 and 37 are provided with their head portions disposed exteriorly of the housing in a manner whereby access may be easily had thereto. As wear takes place on the packing strips, the bolt 37 may be rotated inwardly to move the end dam closer to the rollers. In the event that sufficient wear occurs between the packing strips and the rollers, the packing strips may be removed from the respective grooves and replaced by new ones. It may easily be seen that an efficient union between the end dams and the rollers may be maintained at all times, and that regardless of the wearing away of the packing strips, a watertight compartment exists at all times between the end dams and the rollers 12 and 13.

It is to be understood that the form of my invention herewith shown and described is to be taken as a preferred example of the same, and that various changes in the size, shape, and arrangement of parts may be resorted to without departing from the spirit of my invention or the scope of the appended claims.

Having thus described my invention, I claim:

1. In a milk desiccating apparatus including a pair of coextensive, contiguous rollers having annular recesses at both ends, said rollers being mounted for rotation between the spaced vertical walls of a suitable closed housing, the improvement comprising transverse closure walls removably positioned at the ends of the rollers, said closure walls being formed with an arcuated inwardly convergent lower portion adapted to be received in the annular recesses of the said rollers, removable packing strips carried by the end walls and projecting beyond the plane of the inner face thereof, and frictionally engaging the vertical wall of the recesses of the rollers to effect a watertight union therewith, removable packing strips projecting downwardly from the arcuated lower portion of the end walls and frictionally engaging the horizontal wall of the recesses of the rollers to hold the end walls spaced from the rollers, guides extending from the vertical walls of the housing engaging the top edges of the closure walls to hold the said second packing strips in pressed engagement with the rollers, and adjusting screws extending through the vertical walls of the housing and engaging the closure walls to move the same longitudinally of the rollers to regulate the degree of frictional engagement of the said first packing strips with their respective surfaces.

2. In a milk desiccating apparatus of the type wherein contiguously positioned rollers are mounted for rotation between and in close proximity to spaced vertical walls of a closed housing, said rollers having end closure walls removably associated therewith, the improvement comprising adjustable screws extending through the above-mentioned vertical walls of the housing and engaging the closure walls, said screws being operable exteriorly of the housing to move the said closure walls axially of the rollers, and horizontal guide members extending from the vertical walls of the housing and engaging end walls to permit horizontal sliding movement of the same but preventing vertical displacement thereof relative to the rollers.

HENRY MAGNUS.